（12）United States Patent
Hosoai et al.

(10) Patent No.: US 12,106,384 B2
(45) Date of Patent: *Oct. 1, 2024

(54) DUPLICATE INVOICE DETECTION AND MANAGEMENT

(71) Applicant: Coupa Software Incorporated, San Mateo, CA (US)

(72) Inventors: Yutaka Hosoai, Carlsbad, CA (US); Shoan Jain, Oakland, CA (US); Ankit Narang, Jalandhar (IN); Kiran Ratnapu, San Jose, CA (US)

(73) Assignee: Coupa Software Incorporated, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,142

(22) Filed: Jul. 12, 2023

(65) Prior Publication Data

US 2023/0351524 A1     Nov. 2, 2023

Related U.S. Application Data

(63) Continuation of application No. 17/197,923, filed on Mar. 10, 2021, now Pat. No. 11,763,395.

(30) Foreign Application Priority Data

Jan. 27, 2021   (IN) .............................. 202111003619

(51) Int. Cl.
*G06Q 40/12* (2023.01)
*G06F 16/901* (2019.01)
*G06Q 30/04* (2012.01)

(52) U.S. Cl.
CPC ......... *G06Q 40/12* (2013.12); *G06F 16/9024* (2019.01)

(58) Field of Classification Search
CPC .... G06Q 40/12; G06F 16/9024; G06F 16/215
(Continued)

(56) References Cited

U.S. PATENT DOCUMENTS 6,963,885 B2 * 11/2005 Calkins ................. G06Q 30/04
                                                       707/751
10,043,166 B1    8/2018 Kazenas et al.
(Continued)

FOREIGN PATENT DOCUMENTS

CA        2577271 A1    3/2006

OTHER PUBLICATIONS

Overview—GraphFrames 0.8.0 Documentation at https://graphframes.github.io/graphframes/docs/_site/index.html, downloaded Jun. 8, 2021, 2 pages.
Wikipedia, Levenshtein distance at https://en.wikipedia.org/wiki/Levenshtein_distance, downloaded Jun. 8, 2021, 8 pages.

*Primary Examiner* — Garcia Ade
(74) *Attorney, Agent, or Firm* — Baker Botts L.L.P.

(57) ABSTRACT

A computer-implemented method for detecting and managing duplicate invoices is provided. In one embodiment, the method includes accessing, in a digital storage device, invoices associated with a buyer computer. Candidate invoices having similar attributes are identified from the invoices and nodes representing the candidate invoices are created and stored in computer memory. At least two of the candidate invoices are determined likely to be duplicate invoices and an edge is generated between nodes representing the at least two candidate invoices, indicating that the at least two candidate invoices are likely to be duplicate invoices. A set of filters is programmatically applied using the at least two candidate invoices as inputs. The at least two candidate invoices are determined to be duplicate invoices based on an output of the set of filters and a notification is
(Continued)

sent to the buyer computer indicating that the at least two candidate invoices are duplicate invoices.

21 Claims, 6 Drawing Sheets

(58) Field of Classification Search
USPC .......................................................... 705/30
See application file for complete search history.

(56) References Cited

U.S. PATENT DOCUMENTS

| | | | |
|---|---|---|---|
| 2001/0014880 A1* | 8/2001 | Beach | G06Q 40/04 705/40 |
| 2003/0204458 A1* | 10/2003 | Carroll | G06Q 30/04 705/35 |
| 2006/0095373 A1* | 5/2006 | Venkatasubramanian | G06Q 20/102 705/40 |
| 2007/0021982 A1* | 1/2007 | Sun | G06Q 10/06 705/2 |
| 2014/0279536 A1* | 9/2014 | Morse | G06Q 10/10 705/311 |
| 2014/0279836 A1 | 9/2014 | Yu et al. | |
| 2016/0253350 A1* | 9/2016 | Moulik | G06F 16/2365 707/694 |
| 2019/0378094 A1* | 12/2019 | Quinn | G06N 20/00 |
| 2020/0104587 A1* | 4/2020 | Bhatnagar | G06F 18/22 |
| 2020/0184281 A1* | 6/2020 | Le | G06N 5/01 |
| 2022/0188885 A1 | 6/2022 | Blackman et al. | |
| 2022/0197947 A1* | 6/2022 | Scheepens | G06F 3/02 |

* cited by examiner

FIG. 3A

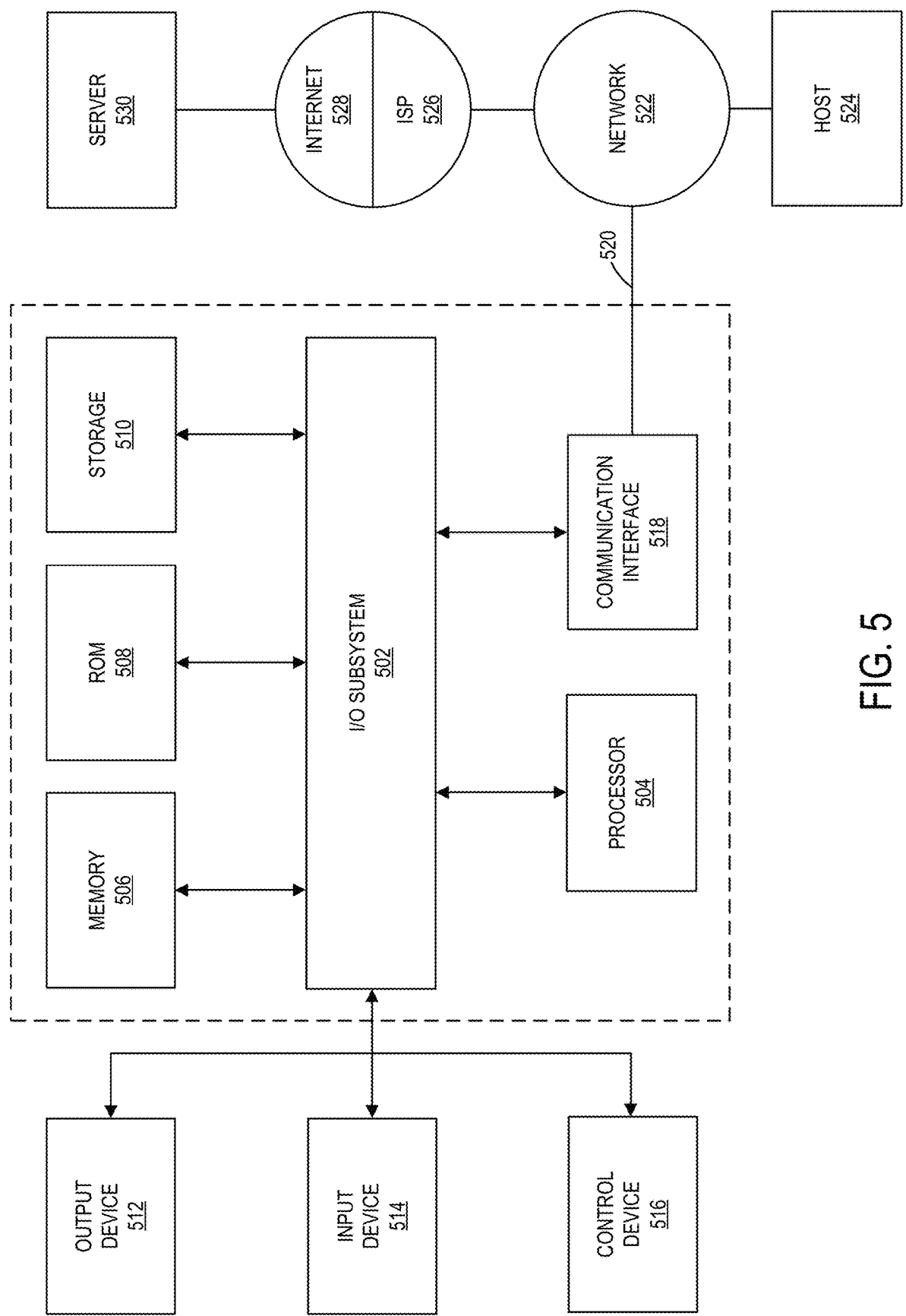

DUPLICATE INVOICE DETECTION AND MANAGEMENT

BENEFIT CLAIM

This application claims the benefit under 35 U.S.C. § 120 as a continuation of application Ser. No. 17/197,923, filed Mar. 10, 2021, which claims the benefit of India application 202111003619, filed Jan. 27, 2021, the entire contents of which are hereby incorporated by reference as if fully set forth herein. Applicant hereby rescinds any disclaimer of claim scope in the application(s) of which the benefit is claimed and advises the USPTO that the present claims may be broader than any application(s) of which the benefit is claimed.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2019-2020 Coupa Software Incorporated.

FIELD OF THE DISCLOSURE

One technical field of the present disclosure is computer-implemented detection of duplicate invoices using a spend management system. Another field is computer-implemented duplicate invoice management using a spend management system. Yet another technical field is computer-implemented electronic presentation of duplicate invoice data via a user interface.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Computer-implemented software-as-a-service (SaaS) systems are now available for a variety of data processing applications. These systems typically offer complex, sophisticated internal data processing applications. For example, e-procurement or spend management systems have been developed to assist enterprises in tracking and planning purchasing and sourcing operations at high volume. When buyers use these systems to order goods or services, suppliers create digital electronic invoices that they transmit to buyers for payment. However, these invoices—which may arrive at the spend management system in large quantities, such as thousands or millions—may include multiple instances of a given invoice, or "duplicate invoices," that are received by the spend management system and subsequently stored into database records.

A supplier may, either advertently or inadvertently, create duplicate invoices for a single instance of a product or service provided from the supplier to a buyer. For example, a supplier may inadvertently, or unwittingly, generate duplicate invoices for a buyer due to improper bookkeeping indicating an incorrect payment status of an invoice for which a payment was previously received from the buyer. This may result in additional instances of the invoice being sent to the buyer for payment. In another example, a supplier may inadvertently generate duplicate invoices for a buyer due to a financial incentive to expedite the payment process resulting in multiple instances of the same invoice being sent to the buyer. In yet another example, a supplier may advertently, or willfully, generate duplicate invoices for a buyer in a malicious attempt to receive multiple payments for a single instance of a product or service provided by the supplier.

In some instances, these duplicate invoices may be detected and mitigated by the buyer before duplicate payments are made. However, in an environment involving thousands to millions of invoices originating from different suppliers for various products or services, all stored in digital electronic form but using different formats and content, merely detecting the duplicate invoices becomes a time-consuming, complex problem. Wide variances in invoice structure, format, fields or attributes, and terminology mean that software inspection of individual invoice documents is difficult and typically consumes large amounts of CPU cycles, storage, memory, network bandwidth, and other resources. Furthermore, both buyer computers and supplier computers demand real-time response from the spend management system in the face of large-scale datasets. Thus, there is a need for ways to substantially reduce the time and complexity involved in detecting and managing duplicate invoices stored in database records of a spend management system.

SUMMARY OF THE INVENTION

The appended claims may serve as a summary of the invention.

BRIEF DESCRIPTION OF THE DRAWINGS

In the drawings:

FIG. 3A, FIG. 3B, FIG. 3C illustrate an example user interface of a spend management system, according to various embodiments.

FIG. 5 illustrates a computer system that may be used to implement embodiments.

DETAILED DESCRIPTION OF EXAMPLE EMBODIMENTS

Figure 1:
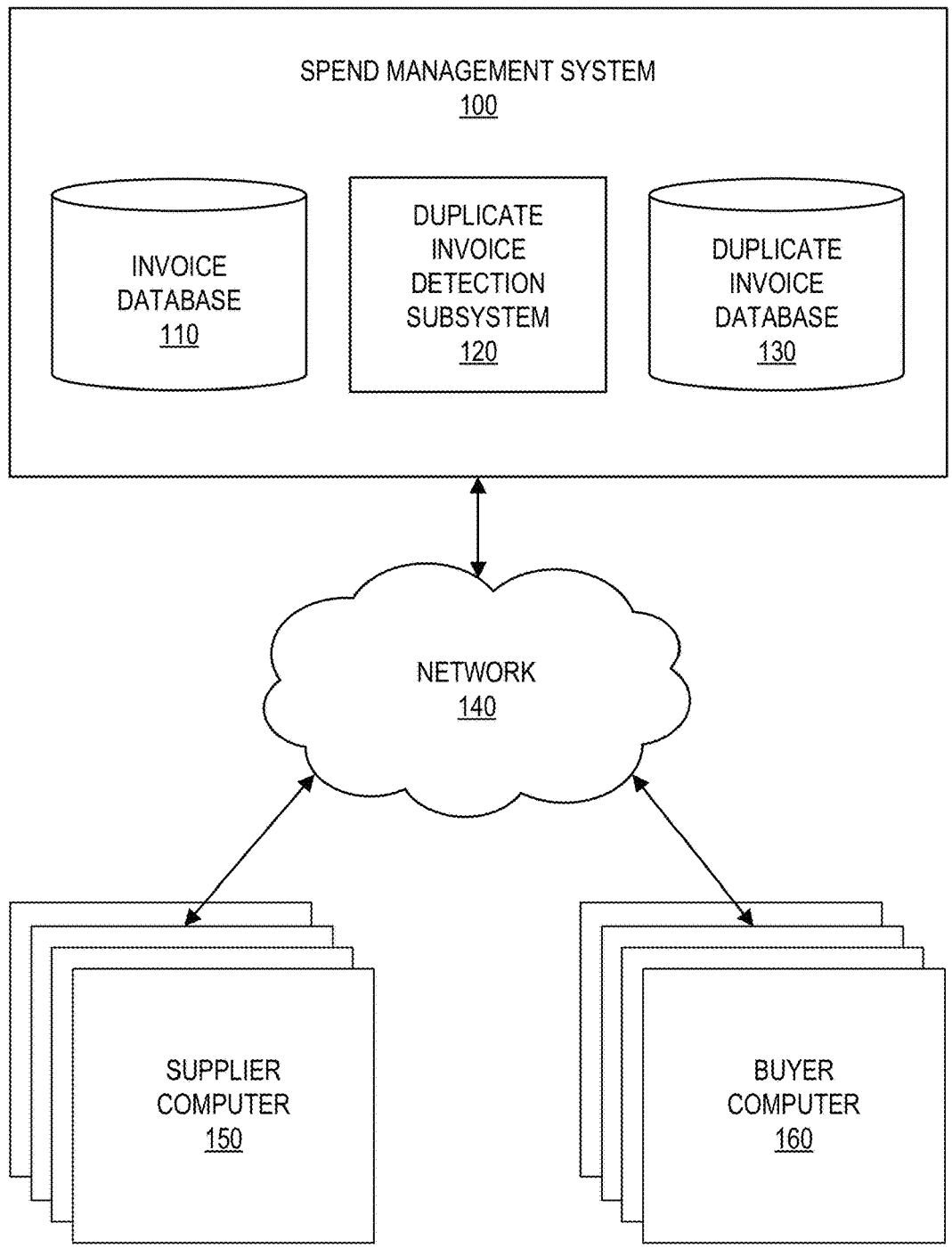
FIG. 1 is a block diagram of an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described herein in sections according to the following outline:

1. General Overview
2. Structural Overview
   2.1 Example Distributed Computer System
   2.2 Invoices, Invoice Clusters, Graphs, Filters, Duplicate Detection
   2.3 User Interface Example
3. Functional Overview
4. Implementation Example—Hardware Overview
5. Benefits; Extensions and Alternatives 1. General Overview Techniques for detecting and managing duplicate invoices are described herein. According to an embodiment, a duplicate invoice detection subsystem may access, in a digital storage device, invoices associated with a buyer computer. From the invoices, the duplicate invoice detection subsystem identifies candidate invoices having similar attributes and creates nodes representing the candidate invoices to be stored in computer memory. The duplicate invoice detection subsystem may determine that at least two of the candidate invoices are likely to be duplicate invoices and may generate an edge between nodes representing the at least two candidate invoices. The edge indicates that the at least two candidate invoices are likely to be duplicate invoices. The duplicate invoice detection subsystem may programmatically apply a set of filters to the at least two candidate invoices using the candidate invoices as inputs. The duplicate invoice detection subsystem may determine that the at least two candidate invoices are duplicate invoices based on an output of the set of filters and may send a notification to the buyer computer indicating that the at least two candidate invoices are duplicate invoices.

In an embodiment, a method comprises, using a duplicate invoice detection subsystem of a spend management system, accessing in a digital storage device a plurality of invoices that are associated with a buyer computer, each of the invoices comprising a digitally stored electronic document; identifying, from the plurality of invoices, a plurality of candidate invoices, each of the plurality of candidate invoices having similar attributes with respect to one another; creating and storing in computer memory a plurality of nodes representing the plurality of candidate invoices, each of the nodes representing a different candidate invoice of the plurality of candidate invoices; determining that at least two candidate invoices of the plurality of candidate invoices are likely to be duplicate invoices, the at least two candidate invoices being represented by at least two nodes of the plurality of nodes; generating an edge between the at least two nodes, the edge indicating that the at least two candidate invoices are likely to be duplicate invoices, the edge and the at least two nodes forming a graph data structure that is digitally stored in the computer memory; programmatically applying a set of filters using the at least two candidate invoices as inputs; determining that the at least two candidate invoices are the duplicate invoices based on an output of the set of filters; and in response to determining that the at least two candidate invoices are the duplicate invoices, executing one or more of: programmatically instructing the digital storage device to delete one of the two candidate invoices; sending a notification to the buyer computer that identifies the at least two candidate invoices and indicates that the at least two candidate invoices are the duplicate invoices.

2. Structural Overview 2.1 Example Distributed Computer System

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the spend management system 100.

FIG. 1 is a block diagram of an example networked computer system in which various embodiments may be practiced. In the embodiment illustrated in FIG. 1, a networked computer system 170 comprises a spend management system 100, supplier computers 150 (individually referred to herein as "a supplier computer 150"), and buyer computers 160 (individually referred to herein as "a buyer computer 160"), which are communicatively coupled directly or indirectly via network 140. The spend management system 100 may include an invoice database 110, a duplicate invoice detection subsystem 120, and a duplicate invoice database 130, which are communicatively coupled via one or more direct or indirect digital electronic network links, using any of wired or wireless, terrestrial or satellite network links, internetworks, and infrastructure gear. The spend management system 100, supplier computers 150, buyer computers 160, and other elements of the networked computer system 170 may each comprise an interface compatible with the network 140 and are programmed or configured to use standardized protocols for communication across the networks such as TCP/IP, Bluetooth, and higher-layer protocols such as HTTP, TLS, and the like. FIG. 1 is shown in simplified, schematic format for purposes of illustrating a clear example and other embodiments may include additional, fewer, and/or different elements.

The computing devices such as the supplier computers 150 and buyer computers 160 may comprise a desktop computer, laptop computer, tablet computer, smartphone, or any other type of computing device that allows access to the spend management system 100. In one embodiment, the supplier computers 150 may generate invoices for products or services provided by respective suppliers for buyers associated with buyer computers 160 (e.g., companies, private entities, business enterprises, and the like). Specifically, supplier computers 150 may generate invoices electronically and provide the electronic documents to spend management system 100 (e.g., via network 140) such that spend management system 100 may electronically present the invoices to buyers for payment. The buyers may access the spend management system 100 using buyer computers 160 to make payments on the invoices accordingly. In one embodiment, supplier computers 150 may generate duplicate invoices for buyers associated with buyer computers 160. That is, a supplier may, either advertently or inadvertently, create duplicate invoices for a single instance of a product or service provided from the supplier to a buyer.

In one embodiment, the spend management system 100 may be programmed or configured for generating electronic pages, alerts, notifications, hyperlinks, recommendations, or application protocol messages to output to the computing devices such as the supplier computers 150 or buyer computers 160. For example, spend management system 100 may be programmed to generate dynamic web pages that implement an application as a software-as-a-service (SaaS) application that a particular supplier computer 150 and buyer computer 160 may access using a web browser hosted at the computing device. In one embodiment, the spend management system 100 may be programmed to generate a dynamic web page used to electronically present invoice data (e.g., presented in PDF format) to supplier computers 150 and/or buyer computers 160. Specifically, spend management system 100 may be programmed to detect duplicate invoices from invoices generated by supplier computers 150 (e.g., stored in invoice database 110) and electronically present the duplicate invoices to buyer computers 160. In one embodiment, the spend management system 100 may be implemented using a server-class computer or other computers having one or more processor cores, co-processors, or other computers. Spend management system 100 may be a physical server computer and/or a virtual server instance stored in a data center, such as through cloud computing.

In one embodiment, the invoice database 110 may comprise a system, device, or apparatus generally operable to digitally store invoices generated by the supplier computers 150. The invoice database 110 may be managed by the spend management system 100 and may include transactional information on one or more suppliers as well as associated details on the suppliers. The invoice database 110 may also include, for each supplier, one or more records of orders or transactions between the buyer and a supplier. In one embodiment, the invoice database 110 may be or include a relational database in which invoices generated by the supplier computers 150 are stored as entries. In other embodiments, invoice database 110 may be or include a centralized database, distributed database, commercial database, operational database, and/or any other database management system suitable for storing invoices generated by the supplier computers 150.

In one embodiment, the duplicate invoice detection subsystem 120 may comprise a system, device, or apparatus executing stored program instructions that are programmed to detect and manage duplicate invoices generated by supplier computers 150. Specifically, duplicate invoice detection subsystem 120 may be programmed to access invoices associated with a buyer computer 160 that are digitally stored in invoice database 110 of the spend management system 100. In one embodiment, each invoice may be digitally stored in the invoice database 110 as an electronic document (e.g., PDF document). In another embodiment, the spend management system 100 may be programmed to extract invoice data from the electronic document such that the invoice data may be accessed directly by the duplicate invoice detection subsystem 120. The duplicate invoice detection subsystem 120 may be programmed to identify candidate invoices from the invoices that share similar attributes with respect to one another (e.g., similar supplier, similar charge amount, similar currency, and the like). In an embodiment, a similar supplier may be obtained by calling a supplier normalization service that is programmed to find similar suppliers and group them. General data normalization techniques are well known in the art. In one approach, a series of fuzzy matching tests and/or regular expressions are formed based on a first entity name or data, then used to match multiple other supplier entity records that have similarities in the name and/or one or more other attributes, such as commodity, address or location, other identifier, prices of past purchases, or other values. In some cases, records of multiple suppliers can be consolidated or used as a basis to suggest one particular supplier record that appears more frequently used or more accurate. Techniques for consolidating supplier records based upon detecting similarities, which can be used as a basis of normalization and determining similar suppliers, are described in application Ser. No. 15/840,936, filed Dec. 13, 2017, U.S. Pat. Pub. No. US-2019-0180294-A1. In one embodiment, the duplicate invoice detection subsystem 120 may be programmed to store the candidate invoices in duplicate invoice database 130 for further processing.

In one embodiment, the duplicate invoice detection subsystem 120 may be programmed to assemble one or more groupings, or "candidate invoice clusters," of candidate invoices from the invoices digitally stored in the invoice database 110. Each candidate invoice cluster includes candidate invoices having similar attributes. The duplicate invoice detection subsystem 120 may be programmed to determine that at least two candidate invoices within a candidate invoice cluster of candidate invoices are likely to be duplicate invoices. In one embodiment, the duplicate invoice detection subsystem 120 may apply various machine matching techniques (e.g., software implementations of a fuzzy matching algorithm, Levenshtein algorithm, and the like, executed by computer) to determine whether candidate invoices are likely to be duplicate invoices. The duplicate invoice detection subsystem 120 may be programmed to programmatically apply a set of filters to the at least two candidate invoices to determine whether the candidate invoices are duplicate invoices. That is, the duplicate invoice detection subsystem 120 may be programmed to apply the set of filters using candidate invoice clusters as inputs and may determine whether the candidate invoices are duplicate invoices based on an output of the set of filters.

In one embodiment, the duplicate invoice detection subsystem 120 may be programmed to execute one or more mitigation strategies upon determining that candidate invoices are duplicate invoices. For example, the duplicate invoice detection subsystem 120 may be programmed to send a notification to a buyer computer 160 identifying the duplicate invoices, block payment for each of the duplicate invoices, and/or delete duplicates of the original invoice from the invoice database 110. In another embodiment, the duplicate invoice detection subsystem 120 may be programmed to store the candidate invoices in duplicate invoice database 130 and electronically present the duplicate invoices to buyer computers 160. The duplicate invoice detection subsystem 120 is described in further detail with respect to FIG. 2.

In one embodiment, the duplicate invoice database 130 may comprise a system, device, or apparatus executing stored program instructions to digitally store duplicate invoices detected by the duplicate invoice detection subsystem 120. Each candidate invoice identified by the duplicate invoice detection subsystem 120 may be digitally stored in the duplicate invoice database 130 for processing. The duplicate invoice detection subsystem 120 may be programmed to determine whether the candidate invoices stored in duplicate invoice database 130 are duplicate invoices as described above. In one embodiment, each candidate invoice may be represented as a node within a graph data structure digitally stored in the duplicate invoice database 130. The duplicate invoice detection subsystem 120 may be programmed to generate an edge between at least two nodes representing at least two candidate invoices, indicating that the at least two candidate invoices are likely to be duplicate invoices. In other embodiments, candidate invoices having similar attributes may be stored in the duplicate invoice database 130 within an array, list, binary tree, heap, multiway tree, hash-based structure, and/or any other data structure suitable for grouping candidate invoices. In one embodiment, the duplicate invoice database 130 may comprise or have programmatic access to a relational database in which duplicate invoices detected by the duplicate invoice detection subsystem 120 are stored as entries. In other embodiments, the duplicate invoice database 130 may be or include a centralized database, distributed database, commercial database, operational database, and/or any other database management system suitable for storing duplicate invoices. The duplicate invoice database 130 is described in further detail with respect to FIG. 2.

Network 140 may be implemented by any medium or mechanism that provides for the exchange of data between the various elements of FIG. 1. Examples of network 140 include, without limitation, a cellular network, communicatively coupled with a data connection to the computing devices over a cellular antenna, one or more Local Area Networks (LANs), one or more Wide Area Networks (WANs), one or more Ethernets or the Internet, or one or more terrestrial, satellite or wireless links, or a combination thereof. For purposes of illustrating a clear example, network 140 is shown as a single element but in practice, network 140 may comprise one or more local area networks, wide area networks, and/or internetworks. The various elements of FIG. 1 may also have direct (e.g., wired or wireless) communications links, depending upon a particular implementation.

2.2 Invoices, Invoice Clusters, Graphs, Filters, Duplicate Detection

Figure 2:
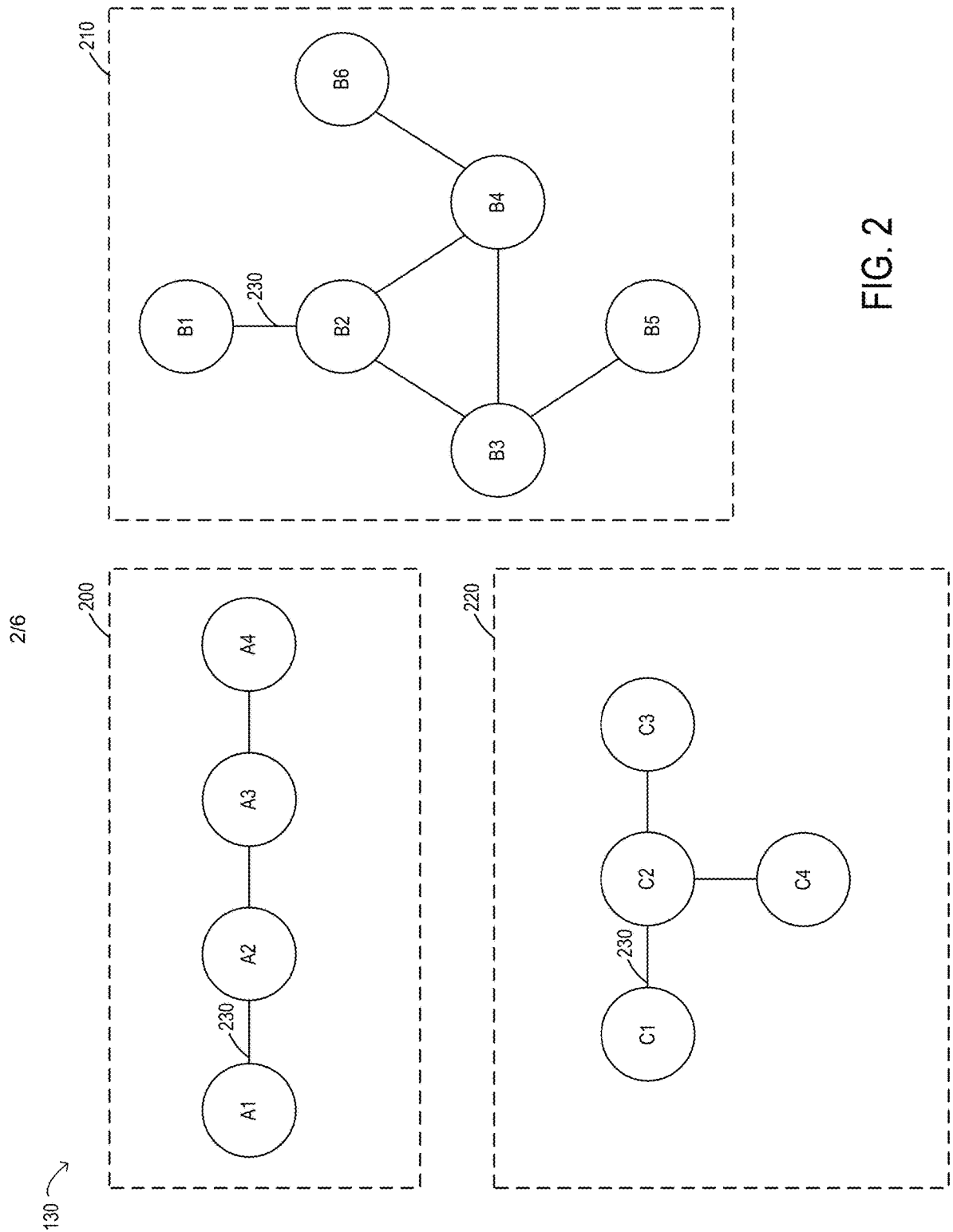
FIG. 2 schematically illustrates example candidate invoices stored in a duplicate invoice database, according to various embodiments.

FIG. 2 schematically illustrates example candidate invoices stored in a duplicate invoice database, according to various embodiments. In this context, "invoice" refers to an electronic document, or digital dataset, that is digitally stored in an electronic storage device and managed programmatically using the techniques that are described herein in other sections.

In the embodiment illustrated in FIG. 2, the duplicate invoice database 130 includes three candidate invoice clusters of candidate invoices comprised of nodes and edges. Specifically, the duplicate invoice database 130 includes candidate invoice clusters 200, 210, and 220 comprised of nodes A1-A4, nodes B1-B6, and nodes C1-C4, respectively. FIG. 2 is shown in simplified, schematic format for purposes of illustrating a clear example and other embodiments may include additional, fewer, and/or different elements.

To form the candidate invoice clusters 200, 210, and 220 of candidate invoices illustrated in FIG. 2, the duplicate invoice detection subsystem 120 may be programmed to identify, for each invoice stored in invoice database 110 (illustrated in FIG. 1), invoices having similar attributes. In one embodiment, examples of similar attributes that are shared across candidate invoices may include a similar buyer for which the invoice was created, a similar supplier of the invoice, a similar monetary amount for which the invoice is charging the buyer, and a similar currency on which the monetary amount is based. Here, the duplicate invoice detection subsystem 120 may be programmed to identify the buyer computer 160 (illustrated in FIG. 1) associated with the buyer, the supplier computer 150 (illustrated in FIG. 1) associated with the supplier, a rounded-off charge amount of the invoice, and a currency type associated with the invoice to identify these similar attributes and form candidate invoice clusters of candidate invoices. In other embodiments, examples of similar attributes shared across candidate invoices may include additional, fewer, and/or different attributes used by the duplicate invoice detection subsystem 120 to form candidate invoice clusters of candidate invoices.

For each candidate invoice cluster, the duplicate invoice detection subsystem 120 may be programmed to create and store nodes representing the candidate invoices comprising the candidate invoice cluster. Specifically, the duplicate invoice detection subsystem 120 may be programmed to create a node for each candidate invoice identified and may store the nodes in the duplicate invoice database 130 for further processing. Referring to FIG. 2, in an embodiment, candidate invoice cluster 200 comprises nodes A1-A4 representing candidate invoices having similar attributes. Similarly, candidate invoice cluster 210 is comprised of nodes B1-B6 representing candidate invoices having similar attributes and candidate invoice cluster 220 is comprised of nodes C1-C4 representing candidate invoices having similar attributes. The duplicate invoice detection subsystem 120 may be programmed to determine that at least two candidate invoices within the candidate invoice cluster are likely to be duplicate invoices. In one embodiment, the duplicate invoice detection subsystem 120 may be programmed to identify an invoice number associated with a candidate invoice for each candidate invoice within a candidate invoice cluster. Specifically, the duplicate invoice detection subsystem 120 may be programmed to identify a number of alphanumeric characters comprising the invoice number for each candidate invoice. To ensure that the candidate invoices within the candidate invoice cluster are not recurring invoices (i.e., invoices created for two or more installment payments on the same purchase), the duplicate invoice detection subsystem 120 may compare the number of alphanumeric characters of respective invoice numbers associated with each candidate invoice within the candidate invoice cluster.

In one embodiment, the duplicate invoice detection subsystem 120 may be programmed to apply a fuzzy matching algorithm to compare the number of alphanumeric characters of respective invoice numbers. If two or more candidate invoices within the candidate invoice cluster have the same number of alphanumeric characters comprising their respective invoice numbers, the duplicate invoice detection subsystem 120 may be programmed to determine that the candidate invoices are recurring invoices created for installment payments. For example, the candidate invoices represented by nodes A1 and A2 of FIG. 2 may have invoice numbers 11254*a* and 11254*b*, respectively. In this example, the fuzzy matching algorithm may determine that the number of alphanumeric characters comprising the respective invoice numbers is the same and that the candidate invoices are likely recurring invoices. However, if two or more invoice numbers within the candidate invoice cluster have different numbers of alphanumeric characters, or a subset of the alphanumeric characters, the duplicate invoice detection subsystem 120 may be programmed to determine that the two or more candidate invoices associated with the invoice numbers are not recurring invoices and are likely to be duplicate invoices.

In one embodiment, the fuzzy matching algorithm may be programmed to identify a Levenshtein distance between invoice numbers having different numbers of alphanumeric characters. If the Levenshtein distance between the invoice numbers is greater than an adjustable threshold distance (e.g., a Levenshtein distance of 3 or more), or if one invoice number is a subset of the other invoice number, the duplicate invoice detection subsystem 120 may determine that the two candidate invoices are not recurring invoices. For example, if the candidate invoices represented by nodes A3 and A4 of FIG. 2 have invoice numbers 11255 and 11255a, respectively, the duplicate invoice detection subsystem 120 may determine that the invoice number for node A3 is a subset of the invoice number for node A4 and that the candidate invoices represented by nodes A3 and A4 are likely duplicate invoices.

Upon determining that at least two candidate invoices with a candidate invoice cluster are likely duplicate invoices, the duplicate invoice detection subsystem 120 may be programmed to generate an edge 230 between the nodes representing the at least two candidate invoices, thereby forming a graph data structure digitally stored in the duplicate invoice database 130 or in main memory. As illustrated in FIG. 2, nodes A1 and A2, nodes A2 and A3, and nodes A3 and A4 each include an edge 230 indicating that the candidate invoices represented by each node pair are likely duplicate invoices.

In one embodiment, the duplicate invoice detection subsystem 120 may be programmed to determine whether at least two candidate invoices within a candidate invoice cluster are duplicate invoices by programmatically applying a set of filters to the candidate invoices. In particular, the duplicate invoice detection subsystem 120 may be programmed to apply a set of filters to candidate invoices represented by respective nodes within a candidate invoice cluster. The duplicate invoice detection subsystem 120 may programmatically apply the set of filters using the candidate invoice clusters as inputs and may determine whether the candidate invoices within each respective candidate invoice cluster are duplicate invoices of one another based on an output of the set of filters.

In one embodiment, the duplicate invoice detection subsystem 120 may programmatically apply the set of filters to candidate invoices within a candidate invoice cluster having a threshold number of nodes. For example, the duplicate invoice detection subsystem 120 may programmatically apply the set of filters to candidate invoices within a candidate invoice cluster having greater than, or equal to, two nodes and fewer than, or equal to, four nodes, such as candidate invoice clusters 200 and 220 illustrated in FIG. 2. By programmatically applying the set of filters to candidate invoices within a candidate invoice cluster having nodes within the threshold number, the duplicate invoice detection subsystem 120 may avoid potential instances of falsely detected duplicate invoices within a candidate invoice cluster. In the example illustrated in FIG. 2, duplicate invoice detection subsystem 120 may filter out, or otherwise remove, candidate invoice cluster 210 from duplicate invoice database 130 given that the number of nodes comprising the candidate invoice cluster exceeds the threshold number of four nodes. In one embodiment, the set of filters may include a credit note filter, a purchase order mismatch filter, and a line description mismatch filter. In other embodiments, the set of filters may include additional, fewer, and/or any number filters suitable for determining whether candidate invoices are duplicate invoices.

In one embodiment, the duplicate invoice detection subsystem 120 may programmatically apply a credit note filter to candidate invoices within a candidate invoice cluster. Specifically, the credit note filter may identify one or more candidate invoices within a candidate invoice cluster for which a credit note has previously been generated (e.g., by a supplier computer 150 via the spend management system 100). Here, a credit note may indicate to the duplicate invoice detection subsystem 120 that a buyer has previously identified that the one or more candidate invoices are duplicate invoices and has notified the supplier and/or spend management system 100 of the duplicate invoices accordingly. If the credit note filter identifies that a credit note has previously been generated for a candidate invoice within a candidate invoice cluster stored in duplicate invoice database 130, the duplicate invoice detection subsystem 120 may remove the candidate invoice from the candidate invoice cluster. For example, the duplicate invoice detection subsystem 120 may remove the candidate invoice represented by node A1 from candidate invoice cluster 200 if the credit note filter identifies that a credit note has previously been generated for the candidate invoice represented by node A1. Upon removing such candidate invoices, the duplicate invoice detection subsystem 120 may programmatically apply additional filters if the number of candidate invoices within a candidate invoice cluster is greater than one invoice.

In one embodiment, the duplicate invoice detection subsystem 120 may programmatically apply a purchase order mismatch filter to candidate invoices within a candidate invoice cluster. The purchase order mismatch filter may identify one or more candidate invoices of the candidate invoice cluster that are not associated with the same purchase order. That is, candidate invoices that are not associated with the same purchase order may indicate to the duplicate invoice detection subsystem 120 that the candidate invoices were created in response to a buyer making separate purchases, thus indicating that the candidate invoices are not duplicate invoices created for the same purchase. In one embodiment, the purchase order mismatch filter may access transactional information on one or more suppliers and/or one or more records of orders or transactions between a buyer and a respective supplier (e.g., stored in invoice database 110) to identify whether at least two invoices within a candidate invoice cluster are associated with the same purchase order. In another embodiment, the spend management system 100 may be programmed to extract purchase order data from invoices stored in invoice database 110 such that the purchase order data may be accessed directly by the purchase order mismatch filter. If the purchase order mismatch filter identifies that separate purchase orders have been created for at least two candidate invoices within a candidate invoice cluster stored in duplicate invoice database 130, the duplicate invoice detection subsystem 120 may be programmed to remove the candidate invoices having separate purchase orders from the candidate invoice cluster. For example, the duplicate invoice detection subsystem 120 may be programmed to remove the candidate invoice represented by node C2 from candidate invoice cluster 220 if the purchase order mismatch filter identifies that a purchase order created for the candidate invoice represented by node C2 does not match a purchase order created for the candidate invoice represented by node C3 within the same candidate invoice cluster 220. Upon removing such candidate invoices, the duplicate invoice detection subsystem 120 may programmatically apply additional filters if the number of candidate invoices within a candidate invoice cluster is greater than one invoice.

In one embodiment, the duplicate invoice detection subsystem 120 may programmatically apply a line description mismatch filter to candidate invoices within a candidate invoice cluster. Each invoice stored in invoice database 110 may include a line description that describes various attributes associated with the purchase for which the invoice was created. Specifically, each invoice electronically presented on the spend management system 100 may include a line description comprised of a free-form text field in which a supplier may manually enter a description of the item that was purchased. For example, a line description appearing on an invoice may indicate a month, day, and year in which the purchase was made. In another example, each line description may indicate a part number or serial number of the item, or items, purchased. By programmatically applying the line description mismatch filter to candidate invoices within a candidate invoice cluster, the duplicate invoice detection subsystem 120 may ensure that recurring invoices created for installment payments on a single purchase are not falsely identified as being duplicate invoices of one another. In one embodiment, the line description mismatch filter may be or include a fuzzy matching algorithm that compares line descriptions of respective candidate invoices. In other embodiments, the line description mismatch filter may be or include a Knuth-Morris-Pratt algorithm, a Boyer-Moore string-search algorithm, a two-way string-matching algorithm, and/or any other algorithm suitable for comparing line descriptions of respective candidate invoices.

To evaluate line descriptions for each of the at least two candidate invoices within a candidate invoice cluster, the line description mismatch filter may divide, or otherwise partition, the electronic data comprising the line descriptions of each candidate invoice within a candidate invoice cluster into a critical parts section and a remaining string. In one embodiment, the critical parts section of a line description may include a month name, or an abbreviation thereof, indicating a month in which the purchase was made. For example, a critical parts section of a line description for a candidate invoice may include a month name or abbreviation such as "Jan.," "February," "March," "Dec.," and the like. In another embodiment, the critical parts section may include any alphanumeric characters comprising a part number, serial number, and/or single digits appearing within the line description of a candidate invoice. For example, the line description mismatch filter may divide a single digit of "5" appearing in a line description of a candidate invoice into the critical parts section given that the single digit may indicate a day within a month on which the purchase was made.

In one embodiment, the remaining string of a line description may include text and/or any other electronic data appearing in the line description that is not included in the critical parts section. Here, the line description mismatch filter may identify a Levenshtein distance between the remaining strings of line descriptions of respective candidate invoices within a candidate invoice cluster. If the Levenshtein distance between the remaining strings is greater than an adjustable threshold distance (e.g., a Levenshtein distance of 3 or more) and the critical parts sections of the respective candidate invoices are an exact match, the line description mismatch filter may determine that the candidate invoices are duplicate invoices. However, if the Levenshtein distance between the remaining strings is less than the adjustable threshold and/or if the critical parts sections of the respective candidate invoices are not an exact match, the line description mismatch filter may determine that the candidate invoices are not duplicate invoices and are likely recurring invoices created for installment payments. In one embodiment, the duplicate invoice detection subsystem 120 may remove the candidate invoices having different line descriptions from the candidate invoice cluster. Upon removing such candidate invoices, the duplicate invoice detection subsystem 120 may determine that the remaining candidate invoices within a candidate invoice cluster are duplicate invoices if the number of candidate invoices within the candidate invoice cluster is greater than one invoice.

In one embodiment, the duplicate invoice detection subsystem 120 may be programmed to generate a score, or an "audit priority score," for each group of duplicate invoices detected. That is, the duplicate invoice detection subsystem 120 may be programmed to generate an audit priority score for each group of duplicate invoices detected using the set of filters described above. Here, the audit priority score may indicate a certainty associated with determining that candidate invoices within a candidate invoice cluster are duplicate invoices. To determine an audit priority score for a group of duplicate invoices, the duplicate invoice detection subsystem 120 may be programmed to identify one or more additional attributes associated with each duplicate invoice within the group. In one embodiment, example additional attributes associated with a duplicate invoice may include an invoice filename, invoice file size, invoice file type (e.g., indicated by filename extension), invoice date, invoice amount, etc., associated with each duplicate invoice. If the additional attributes match across duplicate invoices with the group, the duplicate invoice detection subsystem 120 may be programmed to assign a high audit priority score for the group indicating that the duplicate invoices are determined to be duplicates with a high certainty. In contrast, if the additional attributes do not match across duplicate invoices, or match across a subset of duplicate invoices, within the group, the duplicate invoice detection subsystem 120 may be programmed to assign a lower audit priority score for the group indicating that the duplicate invoices are determined to be duplicates with a lower certainty in relation to groups of duplicate invoices having high audit priority scores.

2.3 User Interface Example

Figure 3A:
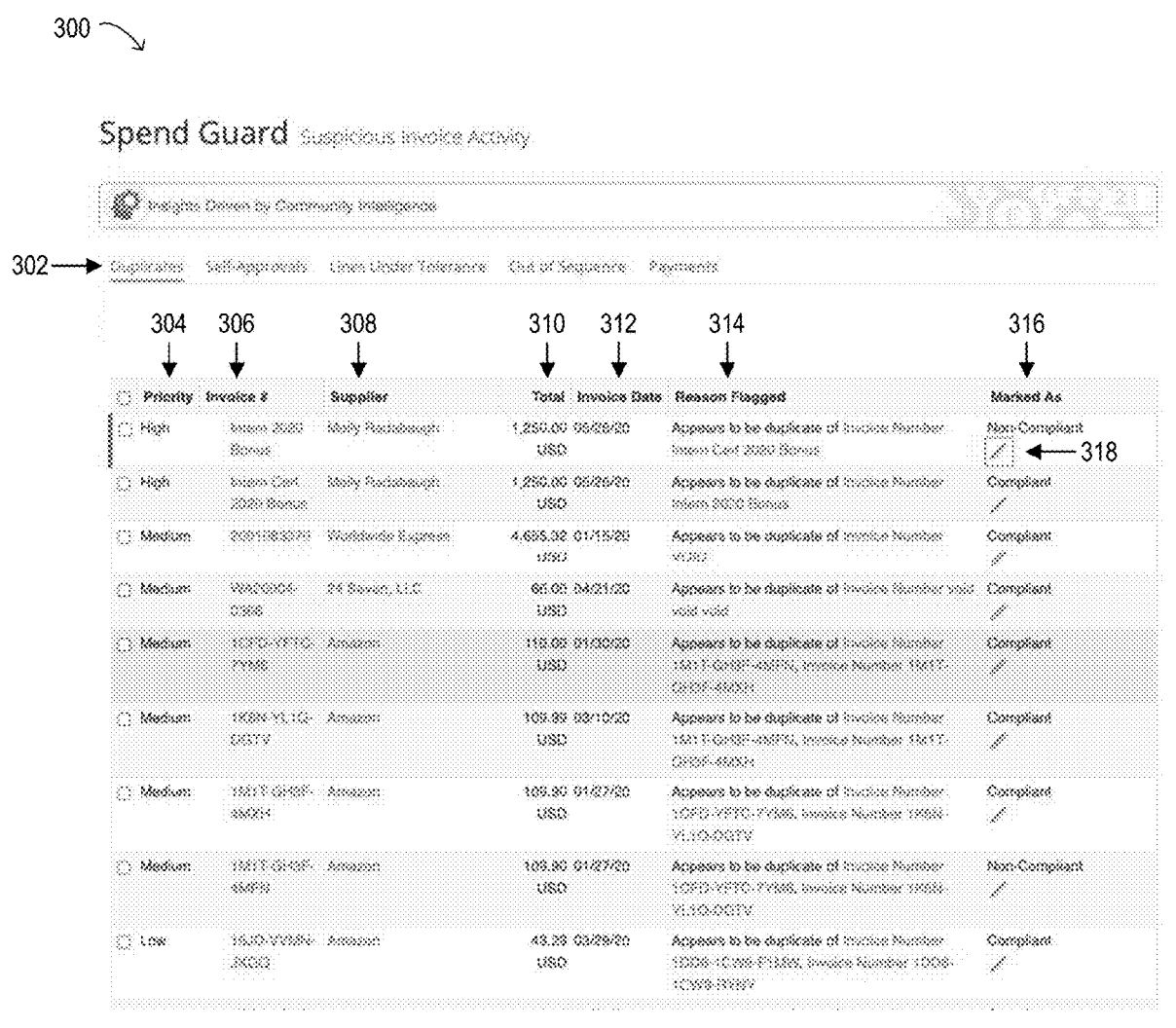
Figure 3B:
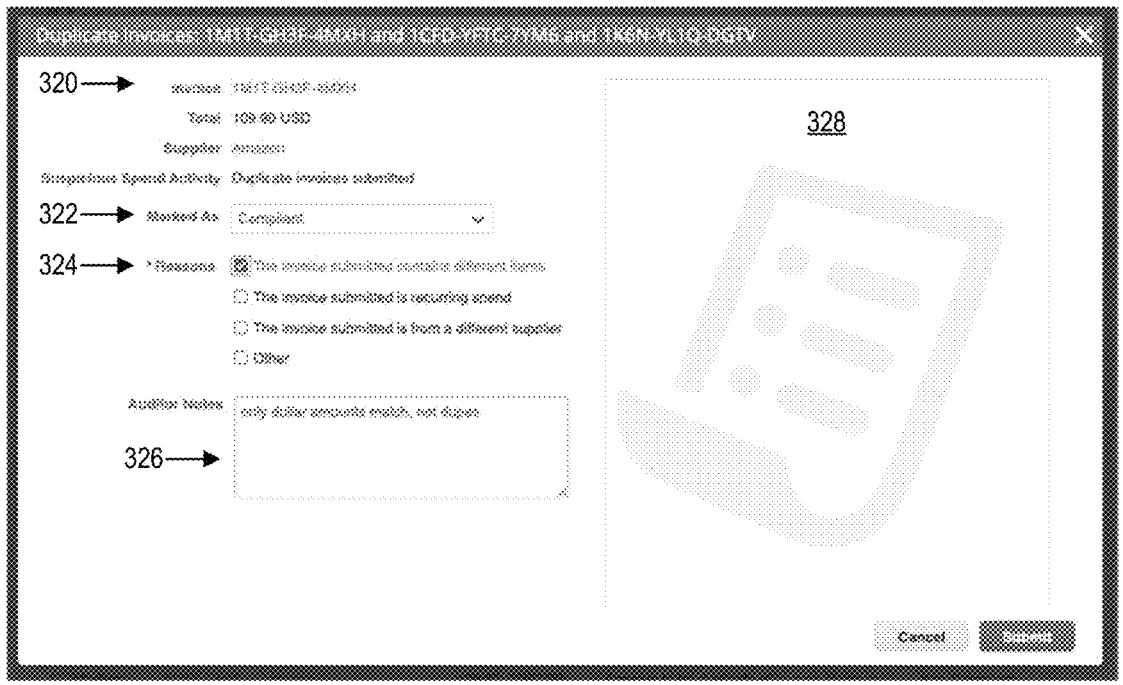
Figure 3C:
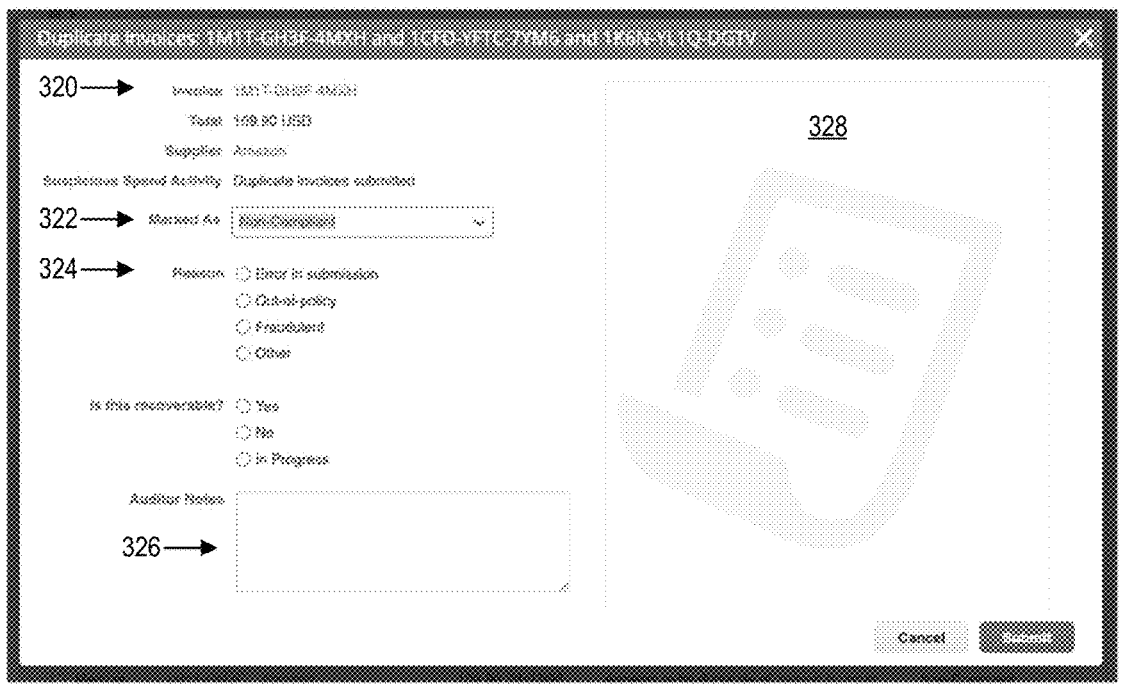

FIG. 3A, FIG. 3B, FIG. 3C illustrate an example user interface of a spend management system, according to various embodiments. In the embodiment illustrated in FIG. 3A, the user interface 300 includes a "duplicates" tab 302 that electronically presents a list of duplicate invoices to a buyer of buyer computer 160 via the user interface 300. In this embodiment, the list of duplicate invoices includes a "priority" column 304, an "invoice number" column 306, a "supplier" column 308, a "total" amount column 310, an "invoice date" column 312, a "reason flagged" column 314, a "marked as" column 316, and an edit icon 318. In other embodiments, the user interface 300 may include additional, fewer, and/or different elements than those shown in FIG. 3A.

In one embodiment, the spend management system 100 may be programmed to rank groups of duplicate invoices based, in part, on the respective audit priority scores associated with each group. Specifically, the spend management system 100 may manage groups of duplicate invoices by electronically presenting (e.g., via user interface 300) groups of duplicate invoices having high audit priority scores above groups of duplicate invoices having medium or low audit priority scores. That is, the spend management system 100 may be programmed to ensure that groups of duplicate invoices having high audit priority scores are more prominently presented on a buyer computer 160 for a buyer than duplicate invoices having lower audit priority scores. This is shown in FIG. 3A where groups of duplicate invoices having a "High" audit priority score shown in the "priority" column 304 are presented in a higher position within the user interface 300 than groups of duplicate invoices having "Medium" or "Low" audit priority scores.

In the example shown in FIG. 3A, the "Intern 2020 Bonus" invoice (shown under the "invoice number" column 306) from the supplier "Molly Radabaugh" (shown under the "supplier" column 308) has a "High" audit priority score (shown under the "priority" column 304). Because this group of duplicate invoices has a higher audit priority score than the "2001083370" invoice (shown under the "invoice number" column 306) from the supplier "Worldwide Express" (shown under the "supplier" column 308) with an audit priority score of "Medium" (shown under the "priority" column 304), the "Intern 2020 Bonus" invoice is presented above the "2001083370" invoice within the user interface 300. By presenting groups of duplicate invoices to buyers in this way, the spend management system 100 ensures that buyers are more likely to identify the invoices as being duplicate invoices, particularly when duplicate invoices are presented in large quantities, such as thousands or millions. Thus, the spend management system 100 may prevent the buyer from making additional payments for a single instance of a product or service provided from the supplier to the buyer. Specifically, a buyer may indicate to the spend management system 100 that invoices are duplicate invoices by designating the invoices as "non-compliant" under the "marked as" column 316 shown in FIG. 3A.

In the examples illustrated in FIG. 3B, FIG. 3C, the user interface 300 includes a duplicate invoice window presenting details associated with a duplicate invoice of a group of duplicate invoices detected by the duplicate invoice detection subsystem 120. In particular, the duplicate invoice window shown in FIG. 3B, FIG. 3C presents details 320 (i.e., invoice number, total, and supplier) associated with invoice "1M1T-GH3F-4MXH" shown in FIG. 3A under the "invoice number" column 306. Additionally, the duplicate invoice window shown in FIG. 3B, FIG. 3C may include a viewing pane 328 that electronically presents an image of the duplicate invoice to a buyer and an "auditor notes" field 326 within which the buyer may include comments regarding the duplicate invoice. In one embodiment, the buyer may access the duplicate invoice window shown in FIG. 3B, FIG. 3C by selecting an invoice link presented under the "invoice number" column 306 shown in FIG. 3A. For example, a buyer may access the duplicate invoice window by clicking on, hovering a cursor over, or otherwise selecting an invoice link within the column. In another embodiment, a buyer may access the duplicate invoice window shown in FIG. 3B, FIG. 3C by selecting the edit icon 318 shown under the "marked as" column 316 shown in FIG. 3A.

In one embodiment, the duplicate invoice window may prompt a buyer to provide feedback regarding each duplicate invoice detected by the duplicate invoice detection subsystem 120. That is, a buyer may indicate to the spend management system 100 whether an invoice has been correctly or falsely detected as being a duplicate invoice by the duplicate invoice detection subsystem 120. In the examples shown in FIG. 3B, FIG. 3C, the duplicate invoice window includes a "marked as" drop-down box 322 that allows the buyer to indicate whether an invoice is "non-compliant" (i.e., a correctly detected duplicate invoice) or "compliant" (i.e., a falsely detected duplicate invoice).

If the buyer determines that the duplicate invoice is compliant as shown in FIG. 3B, the spend management system 100, or duplicate invoice detection subsystem 120 therein, may receive a rejection from the buyer computer 160 indicating that the invoice is not a duplicate invoice. In particular, a buyer may indicate that the invoice is "compliant" via the "marked as" drop-down box 322. The buyer may provide additional details regarding the compliant invoice by selecting one of the "reasons" boxes 324 indicating a reason why the invoice is compliant. In one embodiment, upon receiving the rejection from the buyer computer 160 indicating that the invoice is compliant, the duplicate invoice detection subsystem 120 may be programmed to remove the invoice from the group of duplicate invoices. In another embodiment, the duplicate invoice detection subsystem 120 may be programmed to remove the invoice from the candidate invoice cluster that includes the node representing the invoice. In addition, the spend management system 100 may be programmed to further train the set of filters based on the buyer feedback provided via the "reasons" boxes 324 and/or "auditor notes" field 326 to optimize duplicate invoice detection.

If the buyer determines that the duplicate invoice is non-compliant as shown in FIG. 3C, the spend management system 100, or duplicate invoice detection subsystem 120 therein, may be programmed to receive a confirmation from the buyer computer 160 indicating that the invoice is a duplicate invoice. Specifically, a buyer may indicate that the invoice is "non-compliant" via the "marked as" drop-down box 322 and provide additional details regarding the non-compliant invoice by selecting one of the "reasons" boxes 324 indicating a reason why the invoice is non-compliant. In one embodiment, upon receiving the confirmation from the buyer computer 160 indicating that the invoice is non-compliant, the duplicate invoice detection subsystem 120 may execute one or more mitigation strategies to prevent the buyer from making a payment on the non-compliant invoice. For example, the duplicate invoice detection subsystem 120 may block payment for each of the duplicate invoices confirmed by a buyer as being non-compliant. In another example, the duplicate invoice detection subsystem 120 may programmatically instruct the duplicate invoice database 130 to delete the invoice from the group of duplicate invoices. In yet another example, the duplicate invoice detection subsystem 120 may prompt a workflow within the spend management system 100 that requires an approval chain to approve payment of the invoice. In one embodiment, such an approval chain may include the supplier, or suppliers, that created the duplicate invoice. In other embodiments, the approval chain may include an administrator of the spend management system 100, a financial institution through which the buyer conducts transactions, and/or any other entity suitable for approving payment of the invoice.

3. Functional Overview

Figure 4:
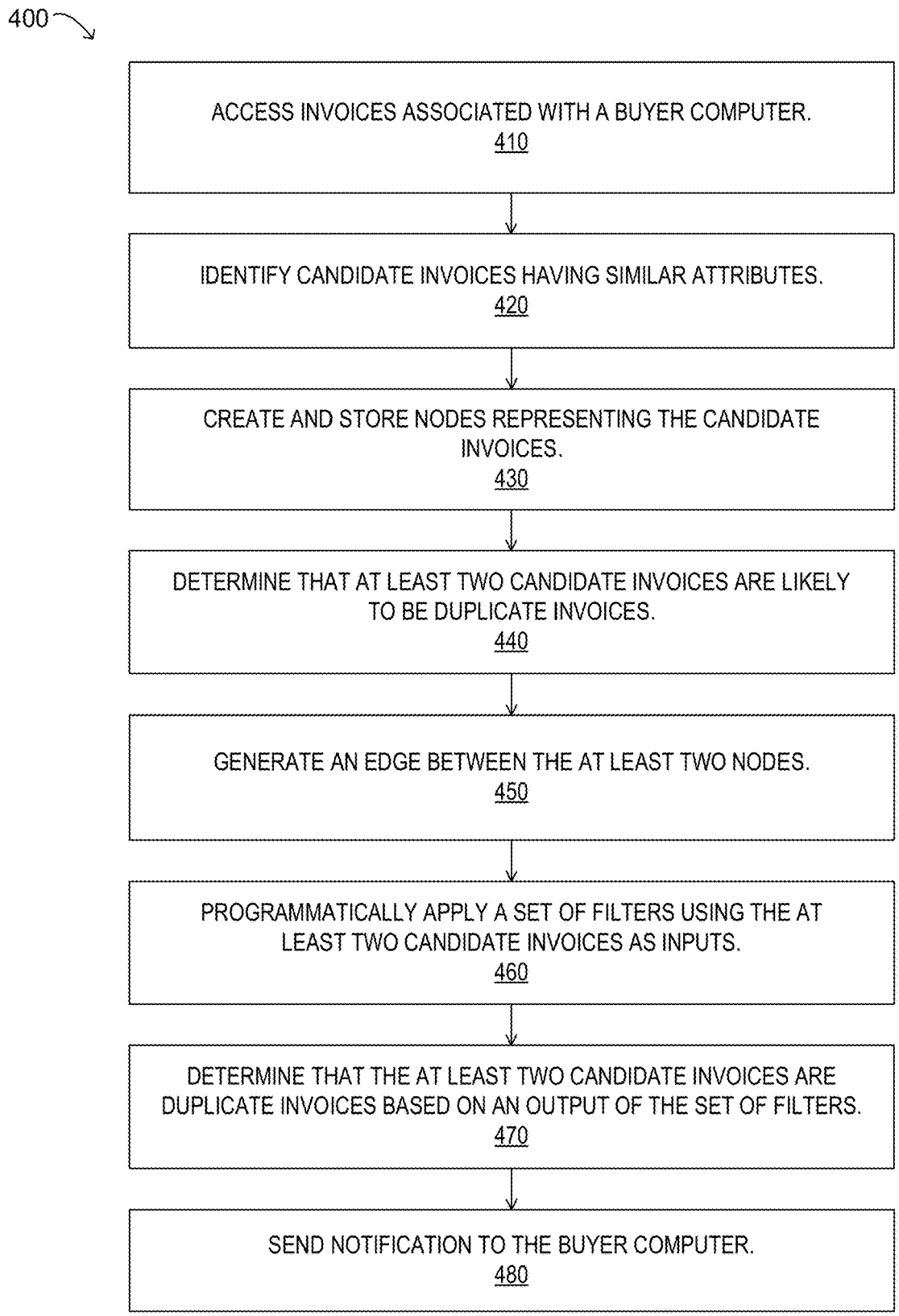
FIG. 4 illustrates a flow diagram of an algorithm that may be programmed to implement an embodiment.

FIG. 4 illustrates a flow diagram of an algorithm that may be programmed to implement an embodiment. FIG. 4, and the other drawing figures and all of the description and claims in this disclosure, are intended to present, disclose and claim a technical system and technical methods in which specially programmed computers, using a special-purpose distributed computer system design, execute functions that have not been available before to provide a practical application of detecting and managing duplicate invoices using a spend management system. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

As an overview, the process of FIG. 4 is generally directed to a method for detecting and managing duplicate invoices. The method may begin at step 410, where the process may be programmed to access invoices that are associated with a buyer computer and stored in a digital storage device. Each invoice may comprise a digitally stored electronic document. For example, the duplicate invoice detection subsystem 120 may access invoices associated with a buyer computer 160 that are digitally stored in invoice database 110 of the spend management system 100 shown in FIG. 1, where each invoice may be digitally stored in the invoice database 110 as an electronic document.

At step 420, the process may be programmed to identify candidate invoices from the invoices stored in the digital storage device. Each of the candidate invoices may have similar attributes with respect to one another. For example, the duplicate invoice detection subsystem 120 may be programmed to identify candidate invoices having similar attributes for each invoice stored in the invoice database 110 illustrated in FIG. 1. Examples of similar attributes shared across candidate invoices may include a similar buyer for which the invoice was created, a similar supplier of the invoice, a similar monetary amount for which the invoice is charging the buyer, and a similar currency on which the monetary amount is based.

At step 430, the process may create and store in computer memory nodes representing the candidate invoices. Each of the nodes may represent a different candidate invoice of the identified candidate invoices. For example, the duplicate invoice detection subsystem 120 may be programmed to create and store candidate nodes representing candidate invoices comprising the candidate invoice clusters 200, 210, and 220 of candidate invoices shown in FIG. 2. Specifically, the duplicate invoice detection subsystem 120 may create a node for each candidate invoice identified and may store the nodes in the duplicate invoice database 130 for further processing.

At step 440, the process may determine that at least two candidate invoices are likely to be duplicate invoices. The at least two candidate invoices may be represented by at least two nodes of the nodes created for each candidate invoice identified. For example, the duplicate invoice detection subsystem 120 may be programmed to identify an invoice number associated with a candidate invoice for each candidate invoice within a candidate invoice cluster as described above with respect to FIG. 2. The duplicate invoice detection subsystem 120 may be programmed to identify a number of alphanumeric characters comprising the invoice number for each candidate invoice and may compare the number of alphanumeric characters of respective invoice numbers associated with each candidate invoice within the candidate invoice cluster to ensure that the candidate invoices are not recurring invoices (i.e., invoices created for two or more installment payments on the same purchase).

At step 450, the process may generate an edge between the at least two nodes. The edge may indicate that the at least two candidate invoices represented by the at least two nodes are likely to be duplicate invoices. For example, the duplicate invoice detection subsystem 120 may be programmed to generate edges 230 between nodes A1 and A2, nodes A2 and A3, and nodes A3 and A4 as shown in FIG. 2, indicating that the candidate invoices represented by each node pair are likely duplicate invoices.

At step 460 and step 470, the process may programmatically apply a set of filters using the at least two candidate invoices as inputs and may determine that the at least two candidate invoices are duplicate invoices based on an output of the set of filters. For example, the duplicate invoice detection subsystem 120 may programmatically apply a set of filters to candidate invoices represented by respective nodes within a candidate invoice cluster. Specifically, duplicate invoice detection subsystem 120 may programmatically apply the set of filters using candidate invoice clusters as inputs. As described above with respect to FIG. 2, the set of filters may include a credit note filter, a purchase order mismatch filter, and a line description mismatch filter. The duplicate invoice detection subsystem 120 may be programmed to determine whether candidate invoices within each candidate invoice cluster are duplicate invoices of one another based on an output of the set of filters as described above with respect to FIG. 2.

At step 480, the process may send a notification to the buyer computer in response to determining that the at least two candidate invoices are duplicate invoices. The notification may identify the at least two candidate invoices and indicate that the at least two candidate invoices are duplicate invoices. For example, the duplicate invoice detection subsystem 120 may be programmed to execute one or more mitigation strategies upon determining that candidate invoices are duplicate invoices, such as sending a notification to a buyer computer 160 identifying the duplicate invoices, blocking payment for each of the duplicate invoices, and/or deleting duplicates of the original invoice from the invoice database 110 as described above with respect to FIG. 1. These mitigation strategies may also include programmatically instructing the duplicate invoice database 130 to delete the invoice from a group of duplicate invoices electronically presented to a buyer via the user interface 300 shown in FIG. 3A, FIG. 3B, FIG. 3C and/or prompting a workflow within the spend management system 100 that requires an approval chain to approve payment of the invoice as described above with respect to FIG. 3C.

4. Implementation Example—Hardware Overview

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. The processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on output device 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host computer 524 or server computer 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which the processor 504 retrieves and executes the instructions. The instructions received by memory 506 may optionally be stored on storage 510 either before or after execution by processor 504.

Computer system 500 also includes a communication interface 518 coupled to network 522. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server computer 530 broadly represents any computer, data center, virtual machine or virtual computing instance with or without a hypervisor, or computer executing a containerized program system such as DOCKER or KUBERNETES. Server computer 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server computer 530 may form elements of a distributed computing system that includes other computers, a processing cluster, server farm or other organization of computers that cooperate to perform tasks or execute applications or services. Server computer 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server computer 530 might transmit a requested code for an application program through internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

5. Benefits; Extensions and Alternatives

Embodiments provide the benefit of a technical solution to the technical problems identified in the Background in at least the following manner. First, the security and resistance to fraud of a spend management system, e-procurement system, or invoice processing system are improved because the automatic stored program techniques described herein will block or reduce the number of duplicate invoices that a supplier can willfully generate in an attempt to receive multiple payments for a single instance of a product or service provided by the supplier. Second, reductions in the number of CPU cycles, memory, storage, network bandwidth, and other resources are achieved because the automatic stored program techniques described herein may block or prevent the storage and incorrect processing of duplicate invoices that have been created in a spend management system, e-procurement system, or invoice processing system erroneously or intentionally. Third, system response time to user requests may be reduced because incorrect duplicate invoices are reduced or eliminated, so that lists, tables, and databases of all invoices associated with a particular supplier are smaller, load faster, and display in less screen real estate or space. Fourth, representing respective candidate invoices as nodes within candidate invoice clusters, and digitally storing the candidate invoice clusters in computer memory as respective graph data structures, affords the spend management system, e-procurement system, or invoice processing system a simplified process for programmatically applying a set of filters to candidate invoices within candidate invoice clusters, thereby reducing the time and complexity associated with managing duplicate invoices for buyers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed using a processor of a duplicate invoice detection subsystem of a spend management system, the computer-implemented method comprising:
using the processor of the duplicate invoice detection subsystem, accessing in a digital storage device a plurality of invoices that are associated with a buyer computer, each of the invoices comprising a digitally stored PDF document;
using the processor of the duplicate invoice detection subsystem, identifying, from the plurality of invoices, a plurality of candidate invoices by calling a supplier normalization service, each of the plurality of candidate invoices having similar attributes with respect to one another based on a Levenshtein distance between strings;
using the processor of the duplicate invoice detection subsystem, creating and storing in computer memory a plurality of nodes representing the plurality of candidate invoices within a graph data structure comprising a candidate invoice cluster of the plurality of nodes having the similar attributes;
in response to determining that the Levenshtein distance is less than a threshold distance, determining, using the processor of the duplicate invoice detection subsystem, that first candidate invoices within the candidate invoice cluster are likely to be recurring invoices based on having a same number of alphanumeric characters of invoice numbers of the first candidate invoices;
in response to determining that the Levenshtein distance is greater than the threshold distance, determining, using the processor of the duplicate invoice detection subsystem, that second candidate invoices within the candidate invoice cluster are duplicate invoices based on having a different number of alphanumeric characters in invoice numbers of the second candidate invoices that are different from the first candidate invoices;
using the processor of the duplicate invoice detection subsystem, programmatically applying a set of filters using the candidate invoice cluster and the second candidate invoices as inputs to filter out candidate invoices that are different from one another within the candidate invoice cluster;
using the processor of the duplicate invoice detection subsystem, determining that the second candidate invoices are the duplicate invoices based on an output of the set of filters;
using the processor of the duplicate invoice detection subsystem, creating one or more groups of duplicate invoices corresponding to the second candidate invoices within the candidate invoice cluster;
using the processor of the duplicate invoice detection subsystem, identifying one or more attributes associated with a duplicate invoice within a first group of duplicate invoices;
using the processor of the duplicate invoice detection subsystem, determining a match of the one or more attributes of the duplicate invoice across other duplicate invoices in the first group of duplicate invoices;
using the processor of the duplicate invoice detection subsystem, programmatically assigning an audit priority score to the first group of duplicate invoices based on the match of the one or more attributes across other duplicate invoices in the first group of duplicate invoices;
based on the audit priority score to the first group of duplicate invoices, using the processor of the duplicate invoice detection subsystem, executing one or more of: programmatically instructing the digital storage device to delete an invoice from the first group of duplicate invoices; creating an approval chain for the invoice in the first group of duplicate invoices.

2. The computer-implemented method of claim 1, further comprising determining that the second candidate invoices within the candidate invoice cluster are duplicate invoices by comparing, for each second candidate invoice, a number of alphanumeric characters of respective invoice numbers of the second candidate invoices, and determining, for each second candidate invoice of the second candidate invoices, that the number of alphanumeric characters is different from one another.

3. The computer-implemented method of claim 1, further comprising programmatically applying the set of filters to the second candidate invoices by programmatically applying a credit note filter to the second candidate invoices, the credit note filter being programmed to identify one or more second candidate invoices of the second candidate invoices for which a credit note has previously been generated and remove the one or more second candidate invoices from the second candidate invoices.

4. The computer-implemented method of claim 1, further comprising programmatically applying the set of filters to the second candidate invoices by programmatically applying a purchase order mismatch filter to the second candidate invoices, the purchase order mismatch filter being programmed to identify one or more second candidate invoices of the second candidate invoices that are not associated with a same purchase order, and remove the one or more second candidate invoices from the second candidate invoices.

5. The computer-implemented method of claim 1, further comprising programmatically applying the set of filters to the second candidate invoices by programmatically applying a line description mismatch filter to the second candidate invoices, the line description mismatch filter being programmed to identify one or more second candidate invoices of the second candidate invoices having line descriptions that describe different purchases, and remove the one or more second candidate invoices from the second candidate invoices.

6. The computer-implemented method of claim 1, wherein the one or more attributes comprises one or more of an invoice filename, invoice file size, invoice file type, invoice date, and an invoice amount, associated with each duplicate invoice within the first group of duplicate invoices.

7. The computer-implemented method of claim 1, wherein the audit priority score indicates a certainty associated with the second candidate invoices that are duplicate invoices.

8. The computer-implemented method of claim 7, further comprising assigning the first group of duplicate invoices a high audit priority score based on the match of the one or more attributes across other duplicate invoices in the first group of duplicate invoices, wherein the high audit priority score indicates a high certainty.

9. The computer-implemented method of claim 7, further comprising assigning the first group of duplicate invoices a low audit priority score, or a medium audit priority score based on the match of the one or more attributes across a subset of the other duplicate invoices in the first group of duplicate invoices, wherein the low audit priority score indicates a low certainty.

10. One or more computer-readable non-transitory storage media storing one or more sequences of stored program instructions which, when executed using a processor of a duplicate invoice detection subsystem of a spend management system, are operable to:
use the processor of the duplicate invoice detection subsystem to access in a digital storage device a plurality of invoices that are associated with a buyer computer, each of the invoices comprising a digitally stored PDF document;
use the processor of the duplicate invoice detection subsystem to identify, from the plurality of invoices, a plurality of candidate invoices by calling a supplier normalization service, each of the plurality of candidate invoices having similar attributes with respect to one another based on a Levenshtein distance between strings;
use the processor of the duplicate invoice detection subsystem to create and store in computer memory a plurality of nodes representing the plurality of candidate invoices within a graph data structure comprising a candidate invoice cluster of the plurality of nodes having the similar attributes;
in response to determining that the Levenshtein distance is less than a threshold distance, use the processor of the duplicate invoice detection subsystem to determine that first candidate invoices within the candidate invoice cluster are likely to be recurring invoices based on having a same number of alphanumeric characters of invoice numbers of the first candidate invoices;
in response to determining that the Levenshtein distance is greater than the threshold distance, use the processor of the duplicate invoice detection subsystem to determine that second candidate invoices within the candidate invoice cluster are duplicate invoices based on having a different number of alphanumeric characters in invoice numbers of the second candidate invoices that are different from the first candidate invoices;
use the processor of the duplicate invoice detection subsystem to programmatically apply a set of filters using the candidate invoice cluster and the second candidate invoices as inputs to filter out candidate invoices that are different from one another within the candidate invoice cluster;
use the processor of the duplicate invoice detection subsystem to determine that the second candidate invoices are the duplicate invoices based on an output of the set of filters;
use the processor of the duplicate invoice detection subsystem to create one or more groups of duplicate invoices corresponding to the second candidate invoices within the candidate invoice cluster;
use the processor of the duplicate invoice detection subsystem to identify one or more attributes associated with a duplicate invoice within a first group of duplicate invoices;
use the processor of the duplicate invoice detection subsystem to determine a match of the one or more attributes of the duplicate invoice across other duplicate invoices in the first group of duplicate invoices;
use the processor of the duplicate invoice detection subsystem to programmatically assign an audit priority score to the first group of duplicate invoices based on the match of the one or more attributes across other duplicate invoices in the first group of duplicate invoices;
based on the audit priority score to the first group of duplicate invoices, use the processor of the duplicate invoice detection subsystem to execute one or more of: programmatically instructing the digital storage device to delete an invoice from the first group of duplicate invoices; creating an approval chain for the invoice in the first group of duplicate invoices.

11. The one or more computer-readable non-transitory storage media of claim 10, further comprising sequences of stored program instructions which, when executed using the duplicate invoice detection subsystem of the spend management system, are operable to determine that the second candidate invoices within the candidate invoice cluster are duplicate invoices by comparing, for each second candidate invoice, a number of alphanumeric characters of respective invoice numbers of the second candidate invoices, and determining, for each second candidate invoice of the second candidate invoices, that the number of alphanumeric characters is different from one another.

12. The one or more computer-readable non-transitory storage media of claim 10, wherein the one or more attributes comprises one or more of an invoice filename, invoice file size, invoice file type, invoice date, and invoice amount, associated with each duplicate invoice within the first group of duplicate invoices.

13. The one or more computer-readable non-transitory storage media of claim 10, further comprising sequences of stored program instructions which, when executed using the duplicate invoice detection subsystem of the spend management system, are operable to programmatically apply the set of filters to the second candidate invoices by programmatically applying a credit note filter to the second candidate invoices, the credit note filter being programmed to identify one or more second candidate invoices of the second candidate invoices for which a credit note has previously been generated, and remove the one or more second candidate invoices from the second candidate invoices.

14. The one or more computer-readable non-transitory storage media of claim 10, further comprising sequences of stored program instructions which, when executed using the duplicate invoice detection subsystem of the spend management system, are operable to programmatically apply the set of filters to the second candidate invoices, by programmatically applying a purchase order mismatch filter to the second candidate invoices, the purchase order mismatch filter being programmed to identify one or more second candidate invoices of the second candidate invoices that are not associated with a same purchase order; and remove the one or more second candidate invoices from the second candidate invoices.

15. The one or more computer-readable non-transitory storage media of claim 10, further comprising sequences of stored program instructions which, when executed using the duplicate invoice detection subsystem of the spend management system, are operable to programmatically apply the set of filters to the second candidate invoices, by programmatically applying a line description mismatch filter to the second candidate invoices, the line description mismatch filter being programmed to identify one or more second candidate invoices of the second candidate invoices having line descriptions that describe different purchases, and remove the one or more second candidate invoices from the second candidate invoices.

16. The one or more computer-readable non-transitory storage media of claim 10, wherein the one or more attributes comprises an invoice filename, invoice file size, invoice file type, invoice date, or invoice amount, associated with each duplicate invoice within the first group of duplicate invoices.

17. The one or more computer-readable non-transitory storage media of claim 10, wherein the audit priority score indicates a certainty associated with the second candidate invoices that are duplicate invoices.

18. A spend management computer system including a duplicate invoice detection subsystem comprising one or more processors and one or more computer-readable non-transitory storage media storing one or more sequences of stored program instructions which, when executed using the one or more processors, are operable to:

use a processor of the duplicate invoice detection subsystem to access in a digital storage device a plurality of invoices that are associated with a buyer computer, each of the invoices comprising a digitally stored PDF document;

use the processor of the duplicate invoice detection subsystem to identify, from the plurality of invoices, a plurality of candidate invoices by calling a supplier normalization service, each of the plurality of candidate invoices having similar attributes with respect to one another based on a Levenshtein distance between strings;

use the processor of the duplicate invoice detection subsystem to create and store in computer memory a plurality of nodes representing the plurality of candidate invoices within a graph data structure comprising a candidate invoice cluster of the plurality of nodes having the similar attributes;

in response to determining that the Levenshtein distance is less than a threshold distance, use the processor of the duplicate invoice detection subsystem to determine that first candidate invoices within the candidate invoice cluster are likely to be recurring invoices based on having a same number of alphanumeric characters of invoice numbers of the first candidate invoices;

in response to determining that the Levenshtein distance is greater than the threshold distance, use the processor of the duplicate invoice detection subsystem to determine that second candidate invoices within the candidate invoice cluster are duplicate invoices based on having a different number of alphanumeric characters in invoice numbers of the second candidate invoices that are different from the first candidate invoices;

use the processor of the duplicate invoice detection subsystem to programmatically apply a set of filters using the candidate invoice cluster and the second candidate invoices as inputs to filter out candidate invoices that are different from one another within the candidate invoice cluster;

use the processor of the duplicate invoice detection subsystem to determine that the second candidate invoices are the duplicate invoices based on an output of the set of filters;

use the processor of the duplicate invoice detection subsystem to create one or more groups of duplicate invoices corresponding to the second candidate invoices within the candidate invoice cluster;

use the processor of the duplicate invoice detection subsystem to identify one or more attributes associated with a duplicate invoice within a first group of duplicate invoices;

use the processor of the duplicate invoice detection subsystem to determine a match of the one or more attributes of the duplicate invoice across other duplicate invoices in the first group of duplicate invoices;

use the processor of the duplicate invoice detection subsystem to programmatically assign an audit priority score to the first group of duplicate invoices based on the match of the one or more attributes across other duplicate invoices in the first group of duplicate invoices;

based on the audit priority score to the first group of duplicate invoices, use the processor of the duplicate invoice detection subsystem to execute one or more of: programmatically instructing the digital storage device to delete an invoice from the first group of duplicate invoices; creating an approval chain for the invoice in the first group of duplicate invoices.

19. The spend management computer system of claim 18, further comprising sequences of stored program instructions which, when executed using the one or more processors, are operable to determine that the second candidate invoices within the candidate invoice cluster are duplicate invoices by comparing, for each second candidate invoice, a number of alphanumeric characters of respective invoice numbers of the second candidate invoices, and determining, for each second candidate invoice of the second candidate invoices, that the number of alphanumeric characters is different from one another.

20. The spend management computer system of claim 18, wherein the one or more attributes comprises one or more of an invoice filename, invoice file size, invoice file type, invoice date, or invoice amount, associated with each duplicate invoice within the first group of duplicate invoices.

21. The spend management computer system of claim 18, wherein the audit priority score indicates a certainty associated with the second candidate invoices that are duplicate invoices.

\* \* \* \* \*